United States Patent
Yang

(10) Patent No.: US 11,115,314 B2
(45) Date of Patent: Sep. 7, 2021

(54) ESTABLISHING ENTRY CORRESPONDING TO EQUAL COST PATHS

(71) Applicant: NEW H3C TECHNOLOGIES CO., LTD., Hangzhou (CN)

(72) Inventor: Sansheng Yang, Beijing (CN)

(73) Assignee: New H3C Technologies Co., Ltd., Zhejiang (CN)

(*) Notice: Subject to any disclaimer, the term of this patent is extended or adjusted under 35 U.S.C. 154(b) by 160 days.

(21) Appl. No.: 16/480,667

(22) PCT Filed: Jan. 25, 2018

(86) PCT No.: PCT/CN2018/074090
§ 371 (c)(1),
(2) Date: Jul. 24, 2019

(87) PCT Pub. No.: WO2018/137677
PCT Pub. Date: Aug. 2, 2018

(65) Prior Publication Data
US 2019/0386910 A1    Dec. 19, 2019

(30) Foreign Application Priority Data
Jan. 25, 2017  (CN) .......................... 201710056674.7

(51) Int. Cl.
*H04L 12/721*   (2013.01)
*H04L 12/707*   (2013.01)
(Continued)

(52) U.S. Cl.
CPC ............ *H04L 45/123* (2013.01); *H04L 45/02* (2013.01); *H04L 45/24* (2013.01); *H04L 45/54* (2013.01)

(58) Field of Classification Search
CPC ....... H04L 45/02; H04L 45/123; H04L 45/24; H04L 45/54
(Continued)

(56) References Cited

U.S. PATENT DOCUMENTS 8,737,269 B1    5/2014  Zhou et al.
9,246,821 B1    1/2016  Li et al.
(Continued)

FOREIGN PATENT DOCUMENTS

CN    101094185 A    12/2007
CN    101572667 A    11/2009
(Continued)

OTHER PUBLICATIONS

ISA State Intellectual Property Office of the People's Republic of China, International Search Report Issued in Application No. PCT/CN2018/074090, dated May 2, 2018, WIPO, 4 pages.
(Continued)

*Primary Examiner* — Gbemileke J Onamuti
(74) *Attorney, Agent, or Firm* — McCoy Russell LLP

(57) ABSTRACT

Methods of establishing an entry corresponding to equal cost paths, network devices and non-transitory machine-readable storage medium are provided. In one aspect, the network establishes a FIB entry, where the FIB entry includes the number of UCMP entries UCMP table corresponding to N paths configured to be equal cost with each other between the network device and a destination network device, where an address of the destination network device, and the number of the UCMP entries in the UCMP table is equal to a preset fixed value; and assigns at least one UCMP entry for each of the N paths based on respective weights of the paths and the fixed value, where the at least one ECMP entry corresponding to the path respectively includes index information corresponding to the path.

13 Claims, 2 Drawing Sheets

(51) Int. Cl.
  *H04L 12/741* (2013.01)
  *H04L 12/751* (2013.01)
(58) Field of Classification Search
  USPC .......................................................... 370/351
  See application file for complete search history.

(56) References Cited

U.S. PATENT DOCUMENTS

| | | | |
|---|---|---|---|
| 9,374,311 | B1 | 6/2016 | Zhou et al. |
| 2013/0083660 | A1 | 4/2013 | Rajagopalan et al. |
| 2018/0109450 | A1* | 4/2018 | Filsfils .................... H04L 45/74 |

FOREIGN PATENT DOCUMENTS

| | | |
|---|---|---|
| CN | 101753455 A | 6/2010 |
| CN | 103078804 A | 5/2013 |
| CN | 104144120 A | 11/2014 |
| WO | 2015175110 A1 | 11/2015 |
| WO | 2015175442 A1 | 11/2015 |

OTHER PUBLICATIONS

State Intellectual Property Office of the People's Republic of China, Office Action and Search Report Issued in Application No. 201710056674.7, dated May 20, 2020, 13 pages. (Submitted with Machine Translation).

Japanese Patent Office, Office Action Issued in Application No. 2019-540083, Jul. 14, 2020, 6 pages (Submitted with Machine Translation).

State Intellectual Property Office of the People's Republic of China, Office Action and Search Report Issued in Application No. 20170056674.7, dated Oct. 30, 2020, 18 pages. (Submitted with Machine Translation).

Japanese Patent Office Action, Office Action Issued in Application No. 2019-540083, dated Nov. 4, 2020, 6 pages. (Submitted with Machine Translation).

Mäkelä, A. et al., "Comparison of load-balancing approaches for multipath connectivity," Computer Networks, vol. 56, No. 8, May 24, 2012, Available Online Mar. 10, 2012, 17 pages.

ISA State Intellectual Property Office of the People's Republic of China, Written Opinion of the International Searching Authority Issued in Application No. PCT/CN2018/074090, dated May 2, 2018, WIPO, 3 pages.

European Patent Office, Extended European Search Report Issued in Application No. 18745078.8, dated Oct. 30, 2019, Germany, 7 pages.

State Intellectual Property Office of the People's Republic of China, Office Action and Search Report Issued in Application No. 201710056674.7, dated Nov. 28, 2019, 14 pages. (Submitted with Partial Translation).

* cited by examiner

ESTABLISHING ENTRY CORRESPONDING TO EQUAL COST PATHS

CROSS REFERENCE TO RELATED APPLICATIONS

The present application is a U.S. National Phase of International Application No. PCT/CN2018/074090, entitled "ESTABLISHMENT FOR TABLE ENTRY OF EQUAL-COST PATH", and filed on Jan. 25, 2018. International Application No. PCT/CN2018/074090 claims priority to Chinese Patent Application No. 201710056674.7 entitled "METHOD AND DEVICE FOR ESTABLISHING ENTRY CORRESPONDING TO EQUAL COST ROUTES", and filed on Jan. 25, 2017. The entire contents of each of the above-listed applications are hereby incorporated by reference for all purposes.

BACKGROUND

As network applications are quickly developing, Unequal Cost Multipath (UCMP) can be widely applied. For the UCMP, different flows can be assigned to different paths. In an example, flows can be assigned to paths 1 and 2 based on a particular proportion (e.g., 2:3). In another example, a bandwidth of the path 1 is 10 G, and a bandwidth of the path 2 is 100 G. When the UCMP is used, the flows can be assigned to the paths 1 and 2 based on a proportion 1:10. By using the UCMP, load sharing efficiency can be improved, and the bandwidth can be efficiently utilized.

DETAILED DESCRIPTION OF THE EMBODIMENTS

Figure 1:
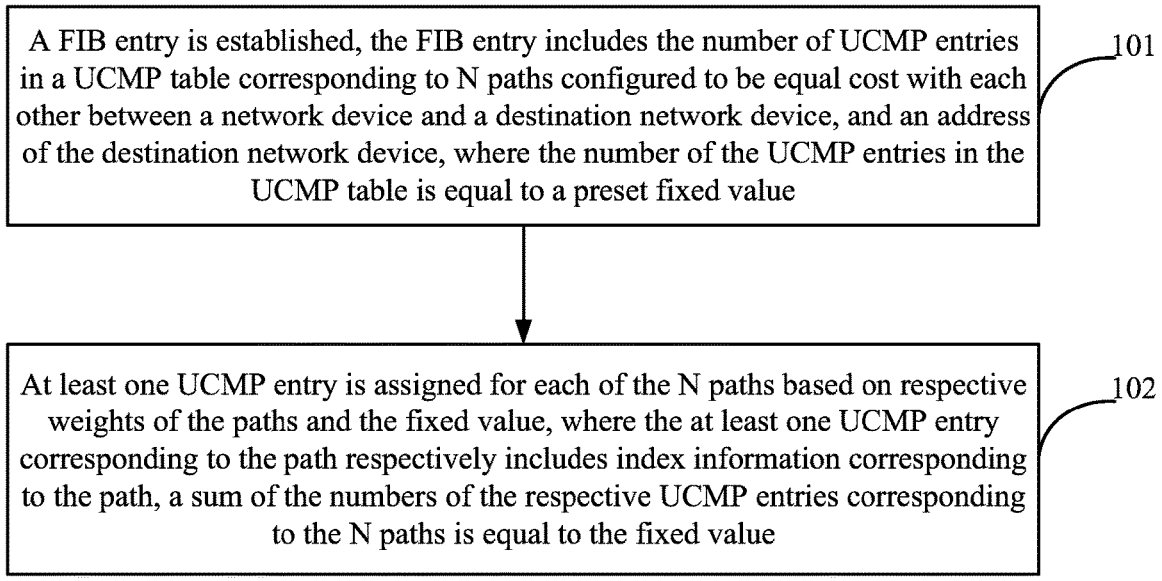
FIG. 1 is a flowchart illustrating a method of establishing an entry corresponding to equal cost paths based on an example of the present disclosure.

The foregoing disclosure is merely illustrative of preferred embodiments of the disclosure but is not intended to limit the disclosure, and any modifications, equivalent substitutions, adaptations, thereof made without departing from the spirit and scope of the disclosure shall be encompassed in the claimed scope of the appended claims.

To implement UCMP, indices in a UCMP table maintained by a network device may be assigned based on a proportion. For example, when a proportion of paths 1 and 2 is equal to 2:3, the UCMP table may include 5 indices, two indices correspond to the path 1, and other 3 indices correspond to the path 2. A Forward Information dataBase (FIB) may include information of a corresponding UCMP table. When receiving a packet, the network device may search out a FIB entry matched with the packet, determine an index corresponding to the packet based on the information of the corresponding UCMP table in the FIB table, and send the packet through a path corresponding to the index in the UCMP table.

Continue with the example above, when the proportion of the paths 1 and 2 is changed, e.g., the proportion is changed to 3:5, the network device may change the number of the indices in the UCMP table to 8, where 3 indices correspond to the path 1, and other 5 indices correspond to the path 2. Further, the network device may adjust the information of the UCMP table in the FIB entry.

Since there are a large amount of FIB entries corresponding to the UCMP table, it takes a long time period to modify the large amount of the FIB entries corresponding to the UCMP table, and the FIB entries corresponding to the UCMP table cannot be used to send packets in the time period, which causes packet loss in the time period.

A method of establishing an entry corresponding to equal cost paths is provided in an example of the present disclosure. The method may apply to a network device which sends packets in a UCMP manner. To implement the UCMP, the network device may at least maintain a FIB table and a UCMP table. Each FIB entry in the FIB table may include contents such as an IP address, the number of UCMP entries in a UCMP table corresponding to the FIB entry, which is not limited in examples of the present disclosure. Each UCMP entry in the UCMP table may include content such as index information of a path, which is not limited in examples of the present disclosure.

In an example, at least two paths between a network device and a destination device may be configured to be equal cost with each other, and the equal cost paths correspond to a UCMP table. For example, the paths 1 and 2 corresponding to the network device are configured to be equal cost with each other, and the equal cost paths 1 and 2 correspond to a UCMP table A. Paths 3 to 5 corresponding to the network device are configured to be equal cost with each other, and the equal cost paths 3 to 5 correspond to a UCMP table B.

In an example, each of the paths which are equal cost with each other corresponds to an interface. The interface may be a physical interface or a logic interface (e.g., an aggregation interface including a plurality of physical interfaces). For example, the path 1 corresponds to a logic interface 1, and the logic interface 1 includes a physical interface A, a physical interface B and a physical interface C; the path 2 corresponds to a logic interface 2, and the logic interface 2 includes a physical interface D and a physical interface E.

FIG. 1 is a flowchart illustrating a method of establishing an entry corresponding to equal cost paths based on an example of the present disclosure. In FIG. 1, the method includes procedures as follows.

At block 101, a FIB entry is established, the FIB entry includes the number of UCMP entries in a UCMP table corresponding to N paths configured to be equal cost with each other between a network device and a destination network device, and an address of the destination network device, where the number of the UCMP entries in the UCMP table is equal to a preset fixed value, and N is an integer more than or equal to 2.

In an example, for each FIB entry in the FIB table, the number of the UCMP entries of the corresponding UCMP table in the FIB entry is the preset fixed value, e.g., 256. In brief, the number of the UCMP entries is the preset fixed value.

At block 102, at least one UCMP entry is assigned for each of the N paths based on respective weights of the paths and the fixed value, where the at least one UCMP entry corresponding to the path respectively includes index information corresponding to the path, a sum of the numbers of the respective UCMP entries corresponding to the N paths is equal to the fixed value.

In an example, the process of assigning at least one UCMP entry for each of the N paths based on respective weights of the paths and the fixed value may include procedures as follows. For each of the N paths, a first numerical value T of the path is determined by multiplying the fixed value by the weight of the path to obtain a product and rounding down the product divided by a total weight, where the total weight is a sum of respective weights of the N paths. A difference between the fixed value and a sum K of the respective first numerical values T of the N paths is determined to be a second numerical value D. When the second numerical value D is equal to zero, for each of the paths, the first numerical value T of the path is determined to be the number of the at least one UCMP entry corresponding to the path. When the second numerical value D is more than zero, the N paths is sorted based on the respective weights of the N paths, for each of first D paths in the sorted N paths, the first numerical value T of the path plus 1 is determined to be the number of the at least one UCMP entry of the path, and for each of remaining paths in the sorted N paths, the first numerical value T of the path is determined to be the number of the at least one UCMP entry of the path.

The number of the UCMP entries in the UCMP table is the fixed value, e.g., 256. [0020]

When the paths 1 and 2 are configured to be equal cost with each other, respective weights may be configured to be the paths 1 and 2. For example, when it is desired that the path 1 carries 30% flows and the path 2 carries 70% flows, the weight of the path 1 may be 3, the weight of the path 2 may be 7, and a proportion of the weights of the paths 1 and 2 is 30%:70%. In an example, the respective weights of the paths 1 and 2 are determined based on respective path bandwidths. For example, it is assumed that the bandwidth corresponding to the path 1 is 30 G (e.g., a sum of bandwidths of the physical interface A, the physical interface B and the physical interface C), and the bandwidth corresponding to the path 2 is 50 G (e.g., a sum of bandwidths of the physical interface D and the physical interface E). The weight of the path 1 may be 3, the weight of the path 2 may be 5, and the proportion of the weights of the paths 1 and 2 is 30 G:50 G.

In the example above, for each of the N paths, the process of determining the first numerical value T of the path includes multiplying the fixed value by the weight of the path to obtain a product, and rounding down the product divided by the total weight, which can be called a first method. In another example, the first numerical value T of the path is determined through a second method or a third method.

The second method may include procedures as follows. The fixed value divided by the total weight is rounded down to obtain a value M. For each of the N paths, a product of the weight of the path and the value M is determined to be a third value E of the path. The fixed value minus a sum L of respective third numerical values E of the N paths is determined to be a difference H. When the difference H is less than the number of the equal cost paths, for each of the N paths, the third numerical value E of the path is determined to be the first numerical value T of the path. When the difference H is no less than the number of the equal cost paths, for each of the N paths, a product of the difference H and the weight of the path is divided by the total value to obtain a value, the obtained value is rounded down to obtain a fourth numerical F of the path, and a sum of the third numerical E and the fourth numerical F of the path is determined to be the first numerical T of the path.

The third method may include procedures as follows. The fixed value divided by the total weight is rounded down to obtain a value M. For each of the N paths, the weight of the path is multiplied by the value M to obtain the third numerical value E of the path. The fixed value minus a sum L of the respective third numerical values E of the N paths is determined to be a difference H. For each of the N paths, a product of the difference H and the weight of the path is divided by the total weight to obtain a value, the obtained value is rounded down to obtain a fourth numerical value F of the path, and a sum of the third numerical value E and the fourth numerical value F of the path is determined to be the first numerical value T of the path.

The processes above are described in detail below in combination with a plurality of application scenarios. In the plurality of application scenarios, it is assumed that the number of UCMP entries in the UCMP table is equal to 256, and the total weight W is equal to A1+A2+ . . . An when there are N paths and a simplest proportion of the N paths is A1:A2:A3 . . . An.

In an application scenario 1, it is assumed that paths 1 to 5 are equal cost with each other, and respective weights of the paths 1 to 5 are 1, 1, 1, 2 and 3. A total weight of the 5 paths is equal to 8.

In an example, the first method is used to determine the first numerical value T. The first numerical value T of the path 1 is set as round down (256*1/8)=32. The first numerical value of the path T 2 is set as round down (256*1/8)=32. The first numerical value T of the path 3 is set as round down (256*1/8)=32. The first numerical value T of the path 4 is set as round down (256*2/8)=64. The first numerical value T of the path 5 is set as round down (256*3/8)=96.

A sum K of the respective first numerical values T of the 5 paths is equal to (32+32+32+64+96)=256. A difference of the fixed value 256 and the sum K is equal to zero. For each of the paths, the first numerical value T of the path is determined to be the number of the UCMP entries corresponding to the path. In particular, the number of the UCMP entries corresponding to the path 1 is equal to 32, the number of the UCMP entries corresponding to the path 2 is equal to 32, the number of the UCMP entries corresponding to the path 3 is equal to 32, the number of the UCMP entries corresponding to the path 4 is equal to 64, and the number of the UCMP entries corresponding to the path 5 is equal to 96.

In an application scenario 2, it is assumed that paths 1 to 5 are equal cost with each other, and respective weights of the paths 1 to 5 are 5, 5, 5, 5 and 8. A total weight of the 5 paths is equal to 28.

In an example, the first method is used to determine the first numerical value T. The first numerical value T of the path 1 is set as round down (256*5/28)=45. The first numerical value T of the path 2 is set as round down (256*5/28)=45. The first numerical value T of the path 3 is set as round down (256*5/28)=45. The first numerical value T of the path 4 is set as round down (256*5/28)=45. The first numerical value T of the path 5 is set as round down (256*8/28)=73.

A sum K of the respective first numerical values T of the 5 paths is equal to (45+45+45+45+73)=253. A difference (a second numerical D) of the fixed value 256 and the sum K 253 is equal to 3, which is more than zero. The 5 paths are sorted in descending order by the respective weights of the 5 paths to obtain an order result, the path 5, the path 1, the path 2, the path 3 and the path 4. Since the respective weights of the paths 1 to 4 are same, an order of the paths 1 to 4 is not limited, and an order, the path 1, the path 2, the path 3 and the path 4, is merely taken as an example. Based on the order result above, the numbers of the respective UCMP entries assigned for first three paths (the paths 5, 1 and 2) are (73+1)=74, (45+1)=46 and (45+1)=46. The numbers of the respective UCMP entries assigned for remaining paths (the paths 3 and 4) are (45+0)=45 and (45+0)=45.

In an application scenario 3, it is assumed that paths 1 to 5 are equal cost with each other, and respective weights of the paths 1 to 5 are 10, 10, 10, 10 and 1. A total weight of the 5 paths is equal to 41.

In an example, the second method is used to determine the first numerical value T. A result of (256/41) is rounded down to obtain 6 (the value M). The third numerical value E of the path 1 is equal to (10*6)=60. The third numerical value E of the path 2 is equal to (10*6)=60. The third numerical value E of the path 3 is equal to (10*6)=60. The third numerical value E of the path 4 is equal to (10*6)=60. The third numerical value E of the path 5 is equal to (1*6)=6. A sum of the respective third numerical values of the paths 1-5 is equal to 246 (L). A difference H between the fixed value 256 and the sum 246 is equal to 10.

The difference 10 is more than the number 5 of the paths. The fourth numerical value F of the path 1 is equal to (round down (10*10/41))=2. The fourth numerical value F of the path 2 is equal to (round down (10*10/41))=2. The fourth numerical value F of the path 3 is equal to (round down (10*10/41))=2. The fourth numerical value F of the path 4 is equal to (round down (10*10/41))=2. The fourth numerical value F of the path 5 is equal to (round down (10*1/41))=0. The first numerical value T of the path 1 is set as (60+2)=62. The first numerical value T of the path 2 is set as (60+2)=62. The first numerical value T of the path 3 is set as (60+2)=62. The first numerical value T of the path 4 is set as (60+2)=62. The first numerical value T of the path 5 is set as (6+0)=6.

A sum K of the respective first numerical values of the 5 paths is equal to (62+62+62+62+6)=254. A difference of the fixed value 256 and the sum 254 is equal to 2, which is more than zero. The 5 paths are sorted in descending order by the respective weights of the 5 paths to obtain an order result, the path 1, the path 2, the path 3, the path 4 and the path 5. Based on the obtained order result, the numbers of the respective UCMP entries assigned for first two paths (the paths 1 and 2) are (62+1)=63 and (62+1)=63. The numbers of the respective UCMP entries assigned to remaining paths (the paths 3, 4 and 5) are (62+0)=62, (62+0)=62 and (6+0)=6.

In an application scenario 4, it is assumed that paths 1 to 5 are equal cost with each other, and respective weights of the paths 1 to 5 are 10, 10, 10, 10 and 13. A total weight of the 5 paths is equal to 53.

In an example, the third method is used to determine the first numerical value T. A result of (256/53) is rounded down to obtain 4 (the value M). The third numerical value E of the path 1 is equal to (10*4)=40. The third numerical value E of the path 2 is equal to (10*4)=40. The third numerical value E of the path 3 is equal to (10*4)=40. The third numerical value E of the path 4 is equal to (10*4)=40. The third numerical value E of the path 5 is equal to (13*4)=52. A sum L of the respective third numerical values of the paths 1-5 is equal to 212. A difference H between the fixed value 256 and the sum 212 is equal to 44.

The fourth numerical value F of the path 1 is set as round down (44*10/53)=8. The fourth numerical value F of the path 2 is set as round down (44*10/53)=8. The fourth numerical value F of the path 3 is set as round down (44*10/53)=8. The fourth numerical value F of the path 4 is set as round down (44*10/53)=8. The fourth numerical value F of the path 5 is set as round down (44*13/53)=10. A sum L 48 of the third numerical value 40 and the fourth numerical value 8 of the path 1 is determined to be the first numerical value T of the path 1. A sum L 48 of the third numerical value 40 and the fourth numerical value 8 of the path 2 is determined to be the first numerical value T of the path 2. A sum 48 of the third numerical value 40 and the fourth numerical value 8 of the path 3 is determined to be the first numerical value T of the path 3. A sum 48 of the third numerical value 40 and the fourth numerical value 8 of the path 4 is determined to be the first numerical value T of the path 4. A sum 62 of the third numerical value 52 and the fourth numerical value 10 of the path 5 is determined to be the first numerical value T of the path 5.

A sum of the respective first numerical values of the 5 paths is equal to (48+48+48+48+62)=254. A difference of the fixed value 256 and the sum 254 is equal to 2, which is more than zero. The 5 paths are sorted in descending order by the respective weights of the 5 paths to obtain an order result, the path 5, the path 1, the path 2, the path 3 and the path 4. Based on the obtained order result, the numbers of the respective UCMP entries assigned for first two paths (the paths 5 and 1) are (62+1)=63 and (48+1)=49. The numbers of the respective UCMP entries assigned to remaining paths (the paths 2, 3 and 4) are (48+0)=48, (48+0)=48 and (48+0)=48.

Based on the process above, for each of the paths, at least one UCMP entry may be assigned for the path, and index information of the path is recorded in the at least one UCMP entry corresponding to the path. It is assumed that the number of the at least one UCMP entry corresponding to the path 1 is equal to 49, the number of the at least one UCMP entry corresponding to the path 2 is equal to 48, the number of the at least one UCMP entry corresponding to the path 3 is equal to 48, the number of the at least one UCMP entry corresponding to the path 4 is equal to 48, and the number of the at least one UCMP entry corresponding to the path 5 is equal to 63. 49 UMCP entries (e.g., UCMP entries from 1st to 49th) may be assigned for the path 1, and index information of the path 1 is respectively recorded in the 49 UCMP entries corresponding to the path 1. 48 UMCP entries (e.g., UCMP entries from 50th to 97th) are assigned for the path 2, and index information of the path 2 is respectively recorded in the 48 UCMP entries corresponding to the path 2. 48 UMCP entries (e.g., UCMP entries from 98th to 145th) are assigned for the path 3, and index information of the path 3 is respectively recorded in the 48 UCMP entries corresponding to the path 3. 48 UMCP entries (e.g., UCMP entries from 146th to 193th) are assigned for the path 4, and index information of the path 4 is respectively recorded in the 48 UCMP entries corresponding to the path 4. 63 UMCP entries (e.g., UCMP entries from 194th to 256th) are assigned for the path 5, and index information of the path 5 is respectively recorded in the 63 UCMP entries corresponding to the path 5.

In an example, when the number of the equal cost paths is changed to be N' (e.g., adding or deleting a path), at least one UCMP entry is re-assigned for each of the N' paths based on respective weights of the N' paths and the fixed value, where N' is an integer more than or equal to 2.

In another example, when a path is newly added to the equal cost paths, for each of the N paths, the number of at least one decreased UCMP entry corresponding to the path is determined, at least one UCMP entry with the determined number is selected from the at least one UMCP entry corresponding to the path, and the at least one selected UCMP entry is assigned to the added path. For each of the N paths, the process of determining the number of at least one decreased UCMP entry corresponding to the path may include procedures as follows. The number N" of the paths which are equal cost with each other after the new path is added is determined. The number of the at least one UCMP entry corresponding to each of the N" paths is determined based on the respective weights of the N" paths and the fixed value. For each of the N paths, it is determined that the number of the at least one decreased UCMP entry corresponding to the path is equal to a difference between the number of the at least one UCMP entry corresponding to the path in the N paths and the number of the at least one UCMP entry corresponding to the path in the N" paths, where N" is an integer more than or equal to 2.

For example, it is assumed that the equal cost paths include paths 1-5 before a path 6 is added. A weight of the path 1 is equal to 1. A weight of the path 2 is equal to 1. A weight of the path 3 is equal to 1. A weight of the path 4 is equal to 2. A weight of the path 5 is equal to 3. The number of the UCMP entries of the path 1 is equal to 32. The number of the UCMP entries of the path 2 is equal to 32. The number of the UCMP entries of the path 3 is equal to 32. The number of the UCMP entries of the path 4 is equal to 64. The number of the UCMP entries of the path 5 is equal to 96. After the path 6 is newly added to the equal cost paths, the equal cost paths include the paths 1 to 6. A weight of the path 1 is equal to 1. A weight of the path 2 is equal to 1. A weight of the path 3 is equal to 1. A weight of the path 4 is equal to 2. A weight of the path 5 is equal to 3. A weight of the path 6 is equal to 8. A total weight of the 6 paths is equal to 16.

In the example, based on the respective weights of the 6 paths and the fixed value, in the 6 paths, the number of the UCMP entries of the path 1 is equal to 16, the number of the UCMP entries of the path 2 is equal to 16, the number of the UCMP entries of the path 3 is equal to 16, the number of the UCMP entries of the path 4 is equal to 32, the number of the UCMP entries of the path 5 is equal to 48, and the number of the UCMP entries of the path 6 is equal to 128.

When the path 6 is added, the number of the decreased UCMP entries of the path 1 is equal to (32−16)=16, the number of the decreased UCMP entries of the path 2 is equal to (32−16)=16, the number of the decreased UCMP entries of the path 3 is equal to (32−16)=16, the number of the decreased UCMP entries of the path 4 is equal to (64−2)=32, the number of the decreased UCMP entries of the path 5 is equal to (96−8)=48. 16 UCMP entries are randomly selected from the UMCP entries corresponding to the path 1, the index information of the path 1 is respectively deleted from the 16 selected UMCP entries, and the index information of the path 6 is respectively recorded in the 16 selected UMCP entries. 16 UCMP entries are randomly selected from the UMCP entries corresponding to the path 2, the index information of the path 2 is respectively deleted from the 16 selected UMCP entries, and the index information of the path 6 is respectively recorded in the 16 selected UMCP entries. 16 UCMP entries are randomly selected from the UMCP entries corresponding to the path 3, the index information of the path 3 is respectively deleted from the 16 selected UMCP entries, and the index information of the path 6 is respectively recorded in the 16 selected UMCP entries. 32 UCMP entries are randomly selected from the UMCP entries corresponding to the path 4, the index information of the path 4 is respectively deleted from the 32 selected UMCP entries, and the index information of the path 6 is respectively recorded in the 32 selected UMCP entries. 48 UCMP entries are randomly selected from the UMCP entries corresponding to the path 5, the index information of the path 5 is respectively deleted from the 48 selected UMCP entries, and the index information of the path 6 is respectively recorded in the 48 selected UMCP entries.

In another example, when the path 6 is added, the index information recorded in the 256 UCMP entries is respectively deleted, 16 UCMP entries are re-assigned for the path 1, 16 UCMP entries are re-assigned for the path 2, 16 UCMP entries are re-assigned for the path 3, 32 UCMP entries are re-assigned for the path 4, 48 UCMP entries are re-assigned for the path 5, and 128 UCMP entries are re-assigned for the path 6.

In an example, when a path is deleted from the equal cost paths, the number N''' of the equal cost paths after the path is deleted is determined, where N''' is an integer more than or equal to 2; for each of the N''' paths, the number of at least one increased UCMP entry corresponding to the path is determined, at least one UCMP entry with the determined number is selected from the at least one UCMP entry corresponding to the deleted path, and the selected at least one UCMP entry is assigned for the path.

For example, it is assumed that the equal cost paths include paths 1-5 before paths are deleted. A weight of the path 1 is equal to 1. A weight of the path 2 is equal to 1. A weight of the path 3 is equal to 1. A weight of the path 4 is equal to 2. A weight of the path 5 is equal to 3. The number of the UCMP entries corresponding to the path 1 is equal to 32. The number of the UCMP entries corresponding to the path 2 is equal to 32. The number of the UCMP entries corresponding to the path 3 is equal to 32. The number of the UCMP entries corresponding to the path 4 is equal to 64. The number of the UCMP entries corresponding to the path 5 is equal to 96. After the paths are deleted from the equal cost paths, the equal cost paths include the paths 1, 2 and 4. A weight of the path 1 is equal to 1. A weight of the path 2 is equal to 1. A weight of the path 4 is equal to 2. A total weight of the 3 paths is equal to 4.

In the example, based on the respective weights of the 3 remaining paths (the paths 1, 2 and 4) and the fixed value, in the 3 remaining paths, the number of the UCMP entries corresponding to the path 1 is equal to 64, the number of the UCMP entries corresponding to the path 2 is equal to 64, the number of the UCMP entries corresponding to the path 4 is equal to 128.

When the paths 3 and 5 are deleted, the number of the increased UCMP entries of the path 1 is equal to (64−32)=32, the number of the increased UCMP entries of the path 2 is equal to (64−32)=32, and the number of the increased UCMP entries of the path 4 is equal to (128−64)=64. The index information of the path 3 is respectively deleted from the 32 UMCP entries corresponding to the path 3, and the index information of the path 5 is respectively deleted from the 96 UMCP entries corresponding to the path 5. 32 UCMP entries are randomly selected from the 128 UCMP entries, and the index information of the path 1 is respectively recorded in the 32 selected UCMP entries. 32 UCMP entries are randomly selected from the 96 remaining UCMP entries, and the index information of the path 2 is respectively recorded in the 32 selected UCMP entries. The index of the path 4 is respectively recorded in the 64 remaining UCMP entries.

In another example, when the paths 3 and 5 are deleted, the respective index information recorded in the 256 UCMP entries is respectively deleted, 64 UCMP entries are re-assigned for the path 1, 64 UCMP entries are re-assigned for the path 2, and 128 UCMP entries are re-assigned for the path 4.

In an example, in the cases of adding or deleting a path, to determine which at least one UCMP entry corresponds to the path, the network device can maintain a correspondence between paths and UCMP entries when maintaining the UCMP table, e.g., the path 1 corresponds to UCMP entries from first to 32th, and so on.

In an example, when the weight of the path is changed, a new weight of the path may be determined, and the number of at least one UCMP entry corresponding to each of the N paths is re-obtained based on respective current weights of the N paths and the fixed value. An obtaining method is similar as that when the number of the equal cost paths are changed, which is not repeatedly described herein.

In examples above of the present disclosure, in a UCMP network environment, when the number of the paths is changed, the numbers of at least one UCMP entry corresponding to each of the paths is adjusted while the number of the UCMP entries in the UCMP table is not changed. Thus, the contents of the FIB entry cannot be updated because the information of the UCMP table (e.g., the number of the UCMP entries) in the FIB entry is not changed, and the FIB entry can still be used to send packets in a way that packet loss can be avoided.

It is assumed that a path is added to the equal cost paths, or a path is deleted from the equal cost paths, e.g., a path is deleted from 16 paths, the UCMP entries are desired to be updated, the FIB entry is further desired to be updated because the number of the UCMP entries is changed. It is assumed that there are 100,000 FIB entries associated with the UCMP entries. A time period when the UCMP entries and the FIB entries are updated is about 1 s. In examples of the present disclosure, when the path is added to the equal cost paths or deleted from the equal cost paths, the UCMP entries are updated while the FIB entries are not updated because the number of the UCMP entries is not changed. Even though there are a large amount of FIB entries associated with the UCMP entries, the time period of updating the UCMP entries is about 20 ms, which can save the updating time period 50 times.

Based on the examples above of maintaining FIB entries and UCMP entries, a method of sending a packet is further provided in examples of the present disclosure, which may be applied to a network device. In an example, the method may include procedures as follows.

After a packet is received, a FIB entry matched with the packet is determined, the FIB entry may include the number of UCMP entries of a corresponding UCMP table, and the number of the UCMP entries in the FIB table is a fixed value. A random value is generated. A location of an UMCP entry matched with the packet is obtained based on the random value and the number of the UCMP entries (the number of the UCMP entries of the corresponding UCMP table in the FIB entry). A UCMP entry corresponding to the obtained location is determined in the UCMP table. The packet is forwarded through a path corresponding to the index information recorded in the determined UCMP entry.

In an example, the FIB entry includes contents such as an IP address, the number of the UCMP entries of the UCMP table associated with the FIB entry. When receiving the packet, the network may search out the FIB entry matched with the target IP address of the packet, e.g., the IP address in the FIB entry is same as the target IP address of the packet.

[0058] The process of determining the location matched with the packet based on the random value and the number of the UCMP entries may include procedures as follow. The random value (which may be a positive integer) is divided by the number of the UCMP entries to obtain a remainder. The location matched with the packet is determined based on the remainder, e.g., the location matched with the packet is the (the remainder+1) th UCMP entry in the UCMP table. For example, it is assumed that the generated random value is equal to 10, and the remainder of (10/256) is equal to 10. It can be determined that the 11th UCMP entry is matched with the packet. For another example, it is assumed that the generated random value is equal to 256, and the remainder of (256/256) is equal to 0. It can be determined that the first UCMP entry is matched with the packet, and so on. Since the random value is randomly generated, the remainder of dividing the random value by 256 can be equally assigned for the 256 UCMP entries, so as to implement equal assignment in the 256 UCMP entries.

In an example, since the FIB entry includes an index of the UCMP table, the UCMP table matched with the index can be searched out. The UCMP table includes 256 UCMP entries. It is assumed that the location matched with the packet corresponds to the 11th UCMP entry in the UCMP table. The 11th UCMP entry can be determined in the UCMP table. In the examples above, each UCMP entry may include the index information of a path, and the packet can be sent through the path (e.g., the path 1) corresponding to the index information recorded in the 11th UCMP entry (e.g., the index information of the path 1).

Figure 2:
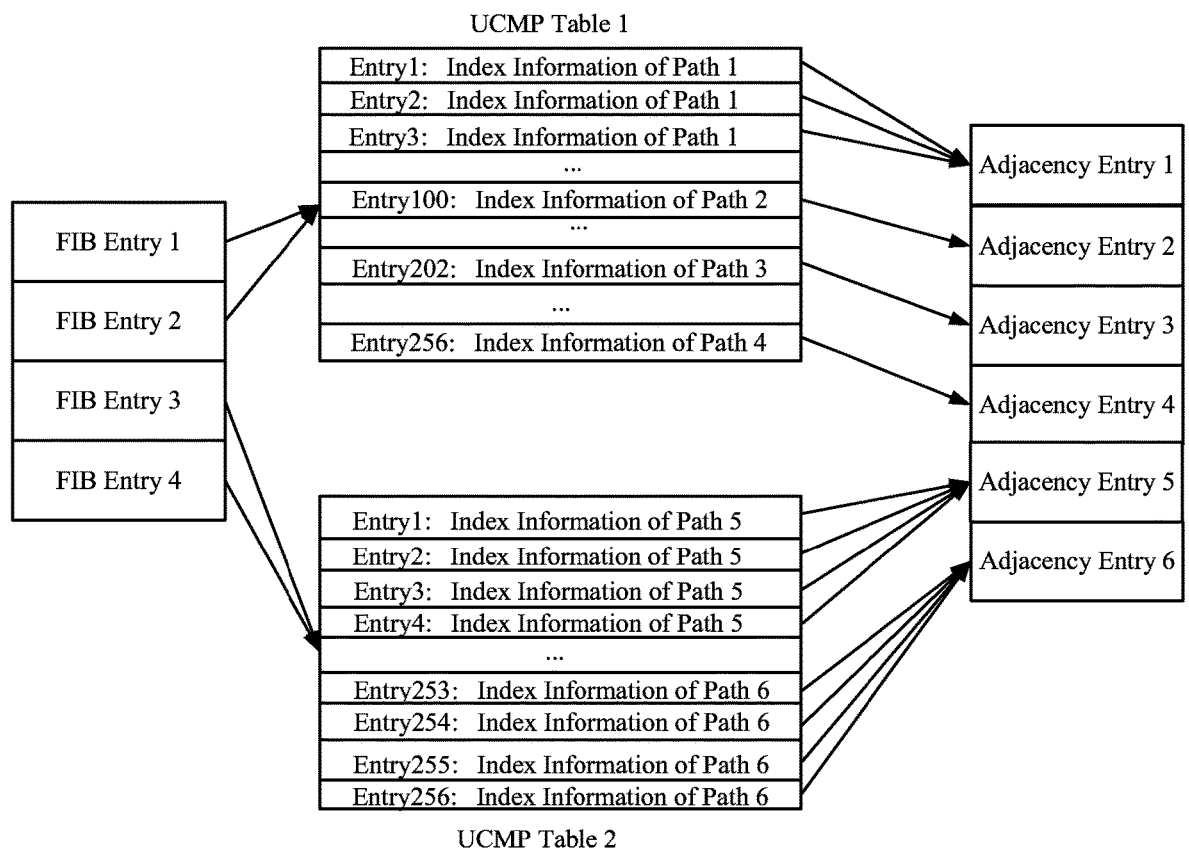
FIG. 2 is a schematic diagram illustrating a relationship of a FIB table, UCMP tables and an adjacency table based on an example of the present disclosure.

In an example, in FIG. 2, the network device may maintain a FIG table (each entry in the FIB table may be a FIB entry), a UCMP table (each entry in the UCMP table may be a UCMP entry), and an adjacency table (each entry in the adjacency table may be an adjacency entry). The FIB entry may record an index of the UCMP table. The UCMP may be searched out through the index. Further, the FIB entry may include the index information of the path (e.g., the index information of the path 1). The index information may be index information of an adjacency entry. An adjacency entry may be searched out through the index information. Further, the adjacency entry may record contents such as an egress interface (the egress interface may be a logic interface or a physical interface, e.g., the interface for the path in the example above), a source Media Access Control (MAC) address (e.g., a MAC address of the egress interface), a target MAC address (e.g., a MAC address of a next hop of the egress interface), and Virtual Local Area Network (VLAN) information (e.g., information of a VLAN to which the egress interface belongs).

The process of sending the packet through the path corresponding to the index information in the determined UCMP entry may include procedures as follows. The adjacency table corresponding to the index information is searched out. The packet is encapsulated based on contents in the adjacency table such as the source MAC address, the target MAC address and the VLAN information. The encapsulated packet is sent through the path corresponding to the adjacency entry (e.g., the egress interface recorded in the adjacency entry).

In an example, the network device may send the packet through a Central Processing Unit (CPU). In another example, the network device may send the packet through a hardware chip such as a Field Programmable Gate Array (FPGA), an Application Specific Integrated Circuit (ASIC) and a Network Processor (NP).

Further, when the packet is sent through the CPU, the CPU may maintain the FIB table, the UCMP table and the adjacency table, and send the packet based on the FIB table, the UCMP table and the adjacency table when receiving the packet. When the packet is sent through the hardware chip, the CPU generates the FIB table, the UCMP table and the adjacency table, and sends the FIB table, the UCMP table and the adjacency table to the hardware chip, and the hardware chip sends the packet based on the CPU, the FIB table, the UCMP table and the adjacency table when receiving the packet.

Methods according to the present disclosure are described above. Devices according to the present disclosure are described below.

Figure 3:
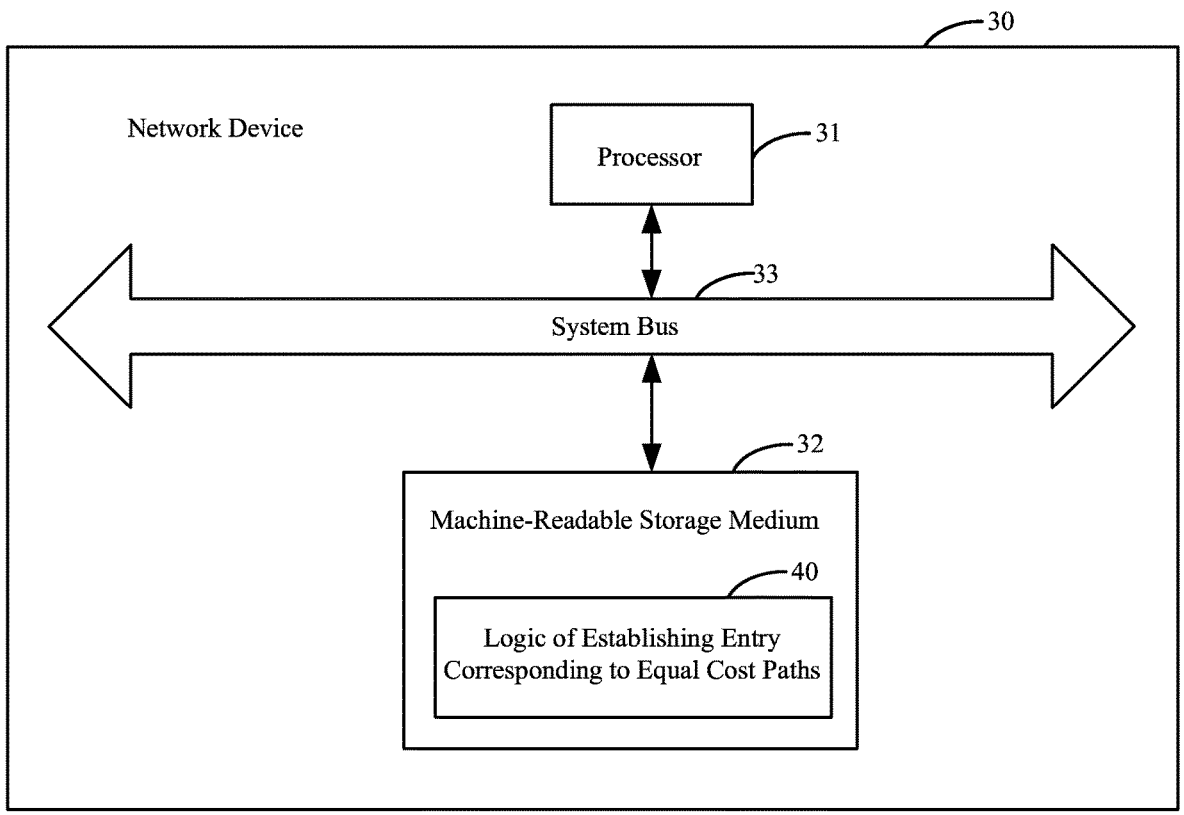
FIG. 3 is a schematic diagram illustrating a hardware structure of a network device based on an example of the present disclosure.
Figure 4:
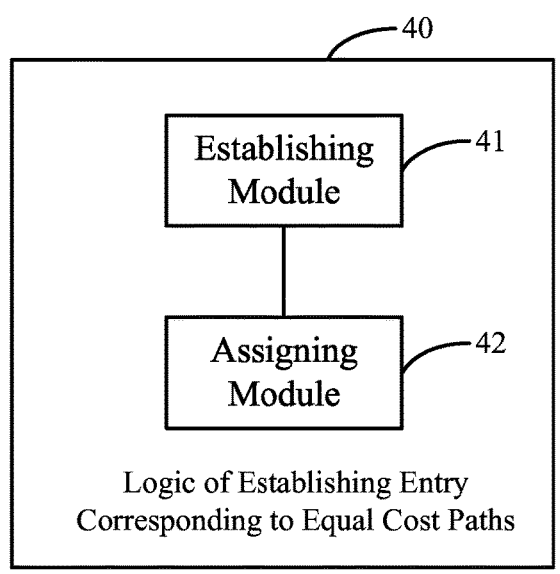
FIG. 4 is a schematic diagram illustrating a structure of a logic for establishing an entry corresponding to equal cost paths based on an example of the present disclosure.

FIG. 3 schematically illustrates a hardware structure diagram of a network device, which is provided by an example of the present disclosure. The network device 30 may include a processor 31 and a machine-readable storage medium 32 storing machine executable instructions. The processor 31 may communicate with the machine-readable storage medium 32 via a system bus 33, and execute the method of establishing an entry corresponding to equal cost paths described above by reading and executing the machine executable instructions corresponding to a control logic 40 for establishing an entry corresponding to equal cost paths in the machine-readable storage medium 32.

As used herein, the machine-readable storage medium 32 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

As shown in FIG. 6, functionally divided, the logic 40 for establishing an entry corresponding to equal cost paths above may include modules as follows.

An establishing module 41 is configured to establish a Forward Information DataBase (FIB) entry, where the FIB entry comprises the number of Unequal Cost Multipath (UCMP) entries in a UCMP table corresponding to N paths configured to be equal cost with each other between the network device and a destination network device, where an address of the destination network device, and the number of the UCMP entries in the UCMP table is equal to a preset fixed value, and N is an integer more than or equal to 2.

An assigning module 42 is configured to assign at least one UCMP entry for each of the N paths based on respective weights of the paths and the fixed value, where the at least one UCMP entry corresponding to the path respectively comprises index information corresponding to the path, a sum of the numbers of the respective UCMP entries corresponding to the N paths is equal to the fixed value.

In an example, the assigning module 42 is configured to determine, for each of the N paths, a first numerical value T of the path by multiplying the fixed value by the weight of the path to obtain a product and rounding down the product divided by a total weight, where the total weight is a sum of the respective weights of the N paths; determine that a second numerical value D is equal to a difference between the fixed value and a sum of the respective first numerical values T of the N paths; when the second numerical value D is equal to zero, determine, for each of the paths, the first numerical value T of the path to be the number of the at least one UCMP entry corresponding to the path; when the second numerical value D is more than zero, sort the N paths based on the respective weights of the N paths, determine, for each of first D paths in the sorted N paths, the first numerical value T of the path plus 1 to be the number of the at least one UCMP entry of the path, determine, for each of remaining paths in the sorted N paths, the first numerical value T of the path to be the number of the at least one UCMP entry of the path.

In an example, the assigning module 42 is further configured to when the number of the paths is changed to be N', re-assign at least one UCMP entry for each of the N' paths based on the respective weights of the N' paths and the fixed value, where N' is an integer more than or equal to 2.

In an example, the assigning module 42 is further configured to when a new path is added to the paths that are equal cost with each other, determine, for each of the N paths, the number of at least one decreased UCMP entry corresponding to the path, select at least one UCMP entry with the determined number from the at least one UMCP entry corresponding to the path, assign the at least one selected UCMP entry to the added path.

In an example, the assigning module 42 is configured to determine the number N" of the paths that are equal cost with each other after the new path is added; determine the number of at least one UCMP entry corresponding to each of the N" paths based on the respective weights of the N" paths and the fixed value; determine, for each of the N paths, that the number of the at least one decreased UCMP entry corresponding to the path is equal to a difference between the number of the at least one UCMP entry corresponding to the path in the N paths and the number of the at least one UCMP entry corresponding to the path in the N" paths, where wherein N" is an integer more than or equal to 2.

In an example, the assigning module 42 is further configured to when a path is deleted from the paths which are equal cost with each other, determine the number N'" of the paths that are equal cost with each other after the path is deleted, where N'" is an integer more than or equal to 2; determine, for each of the N'" paths, the number of at least one increased UCMP entry corresponding to the path, select at least one UCMP entry with the determined number from the at least one UCMP entry corresponding to the deleted path, and assign the selected at least one UCMP entry for the path.

In an example, the assigning module 42 is configured to obtain, at least one UCMP entry corresponding to each of the N'" paths based on the respective weights of the N'" paths and the fixed value; determine, for each of the N'" paths, that the number of the at least one increased UCMP entry is equal to a difference between the number of the at least one UCMP entry corresponding to the path in the N'" paths and the number of the at least one UCMP entry corresponding to the path in the N paths.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of establishing an entry corresponding to equal cost paths, comprising:
    establishing, by a network device, a Forward Information DataBase (FIB) entry, wherein the FIB entry comprises the number of Unequal Cost Multipath (UCMP) entries in a UCMP table corresponding to N paths configured to be equal cost with each other between the network device and a destination network device, and an address of the destination network device, wherein the number of the UCMP entries in the UCMP table is equal to a preset fixed value, and N is an integer more than or equal to 2; and
    assigning, by the network device, at least one UCMP entry for each of the N paths based on respective weights of the paths and the fixed value, wherein the at least one UCMP entry corresponding to the path respectively comprises index information corresponding to the path, a sum of the numbers of the respective UCMP entries corresponding to the N paths is equal to the fixed value,
    wherein assigning the at least one UCMP entry for each of the N paths based on the respective weights of the paths and the fixed value comprises:
        determining, by the network device, for each of the N paths, a first numerical value T of the path by multiplying the fixed value by the weight of the path to obtain a product and rounding down the product divided by a total weight, wherein the total weight is a sum of the respective weights of the N paths;
        determining, by the network device, that a second numerical value D is equal to a difference between the fixed value and a sum of the respective first numerical values T of the N paths;
        when the second numerical value D is equal to zero,
            determining, by the network device, for each of the paths, the first numerical value T of the path to be the number of the at least one UCMP entry corresponding to the path;
        when the second numerical value D is more than zero,
            sorting, by the network device, the N paths based on the respective weights of the N paths,
            determining, by the network device, for each of first D paths in the sorted N paths, the first numerical value T of the path plus 1 to be the number of the at least one UCMP entry of the path,
            determining, by the network device, for each of remaining paths in the sorted N paths, the first numerical value T of the path to be the number of the at least one UCMP entry of the path.

2. The method of claim 1, further comprising:
    when the number of the paths is changed to be N',
        re-assigning, by the network device, at least one UCMP entry for each of the N' paths based on the respective weights of the N' paths and the fixed value, wherein N' is an integer more than or equal to 2.

3. The method of claim 1, further comprising:
    when a new path is added to the paths that are equal cost with each other,
        determining, by the network device, for each of the N paths, the number of at least one decreased UCMP entry corresponding to the path, selecting at least one UCMP entry with the determined number from the at least one UMCP entry corresponding to the path,
        assigning, by the device, the at least one selected UCMP entry to the added path.

4. The method of claim 3, wherein determining, for each of the N paths, the number of at least one decreased UCMP entry corresponding to the path comprises:
    determining, by the network device, the number N" of the paths that are equal cost with each other after the new path is added, wherein N" is an integer more than or equal to 2;
    determining, by the network device, the number of at least one UCMP entry corresponding to each of the N" paths based on the respective weights of the N" paths and the fixed value;
    determining, by the network device, for each of the N paths, that the number of the at least one decreased UCMP entry corresponding to the path is equal to a difference between the number of the at least one UCMP entry corresponding to the path in the N paths and the number of the at least one UCMP entry corresponding to the path in the N" paths.

5. The method of claim 1, further comprising:
    when a path is deleted from the paths which are equal cost with each other,
        determining, by the network device, the number N''' of the paths that are equal cost with each other after the path is deleted, wherein N''' is an integer more than or equal to 2;
        determining, by the network device, for each of the N''' paths, the number of at least one increased UCMP entry corresponding to the path, selecting at least one UCMP entry with the determined number from the at least one UCMP entry corresponding to the deleted path, and assigning the selected at least one UCMP entry for the path.

6. The method of claim 5, wherein determining, for each of the N''' paths, the number of at least one increased UCMP entry corresponding to the path in the N''' paths comprises:

obtaining, by the network device, at least one UCMP entry corresponding to each of the N''' paths based on the respective weights of the N''' paths and the fixed value;

determining, by the network device, for each of the N''' paths, that the number of the at least one increased UCMP entry is equal to a difference between the number of the at least one UCMP entry corresponding to the path in the N''' paths and the number of the at least one UCMP entry corresponding to the path in the N paths.

7. A network device, comprising:

a processor, and a non-transitory machine-readable storage medium storing machine executable instructions which are executable by the processor to:

establish a Forward Information DataBase (FIB) entry, wherein the FIB entry comprises the number of Unequal Cost Multipath (UCMP) entries in a UCMP table corresponding to N paths configured to be equal cost with each other between the network device and a destination network device, and an address of the destination network device, wherein the number of the UCMP entries in the UCMP table is equal to a preset fixed value, and N is an integer more than or equal to 2; and assign at least one UCMP entry for each of the N paths based on respective weights of the paths and the fixed value, wherein the at least one UCMP entry corresponding to the path respectively comprises index information corresponding to the path, a sum of the numbers of the respective UCMP entries corresponding to the N paths is equal to the fixed value, wherein the processor is caused by the machine-executable instructions to:

determine, for each of the N paths, a first numerical value T of the path by multiplying the fixed value by the weight of the path to obtain a product and rounding down the product divided by a total weight, wherein the total weight is a sum of the respective weights of the N paths;

determine that a second numerical value D is equal to a difference between the fixed value and a sum of the respective first numerical values T of the N paths;

when the second numerical value D is equal to zero, determine, for each of the paths, the first numerical value T of the path to be the number of the at least one UCMP entry corresponding to the path;

when the second numerical value D is more than zero, sort the N paths based on the respective weights of the N paths, determine, for each of first D paths in the sorted N paths, the first numerical value T of the path plus 1 to be the number of the at least one UCMP entry of the path, determine, for each of remaining paths in the sorted N paths, the first numerical value T of the path to be the number of the at least one UCMP entry of the path.

8. The network device of claim 7, wherein the processor is caused by the machine-executable instructions further to: when the number of the paths is changed to be N', re-assign at least one UCMP entry for each of the N' paths based on the respective weights of the N' paths and the fixed value, wherein N' is an integer more than or equal to 2.

9. The network device of claim 7, wherein the processor is caused by the machine-executable instructions further to: when a new path is added to the paths that are equal cost with each other, determine, for each of the N paths, the number of at least one decreased UCMP entry corresponding to the path, select at least one UCMP entry with the determined number from the at least one UMCP entry corresponding to the path, assign the at least one selected UCMP entry to the added path.

10. The network device of claim 9, wherein the processor is caused by the machine-executable instructions to:

determine the number N'' of the paths that are equal cost with each other after the new path is added, wherein N'' is an integer more than or equal to 2;

determine the number of at least one UCMP entry corresponding to each of the N'' paths based on the respective weights of the N'' paths and the fixed value;

determine, for each of the N paths, that the number of the at least one decreased UCMP entry corresponding to the path is equal to a difference between the number of the at least one UCMP entry corresponding to the path in the N paths and the number of the at least one UCMP entry corresponding to the path in the N'' paths.

11. The network device of claim 7, wherein the processor is caused by the machine-executable instructions further to: when a path is deleted from the paths which are equal cost with each other, determine the number N''' of the paths that are equal cost with each other after the path is deleted, wherein N''' is an integer more than or equal to 2;

determine, for each of the N''' paths, the number of at least one increased UCMP entry corresponding to the path, select at least one UCMP entry with the determined number from the at least one UCMP entry corresponding to the deleted path, and assign the selected at least one UCMP entry for the path.

12. The network device of claim 11, wherein the processor is caused by the machine-executable instructions to:

obtain, at least one UCMP entry corresponding to each of the N''' paths based on the respective weights of the N''' paths and the fixed value;

determine, for each of the N''' paths, that the number of the at least one increased UCMP entry is equal to a difference between the number of the at least one UCMP entry corresponding to the path in the N''' paths and the number of the at least one UCMP entry corresponding to the path in the N paths.

13. A non-transitory machine-readable storage medium storing machine executable instructions which are invoked and executed by a processor of a network device to:

establish a Forward Information DataBase (FIB) entry, wherein the FIB entry comprises the number of Unequal Cost Multipath (UCMP) entries in a UCMP table corresponding to N paths configured to be equal cost with each other between the network device and a destination network device, and an address of the destination network device, wherein the number of the UCMP entries in the UCMP table is equal to a preset fixed value, and N is an integer more than or equal to 2; and assign at least one UCMP entry for each of the N paths based on respective weights of the paths and the fixed value, wherein the at least one UCMP entry corresponding to the path respectively comprises index information corresponding to the path, a sum of the numbers of the respective UCMP entries corresponding to the N paths is equal to the fixed value, wherein assigning the at least one UCMP entry for each of the N paths based on the respective weights of the paths and the fixed value comprises:
- determining, by the network device, for each of the N paths, a first numerical value T of the path by multiplying the fixed value by the weight of the path to obtain a product and rounding down the product divided by a total weight, wherein the total weight is a sum of the respective weights of the N paths;
- determining, by the network device, that a second numerical value D is equal to a difference between the fixed value and a sum of the respective first numerical values T of the N paths;

when the second numerical value D is equal to zero,
- determining, by the network device, for each of the paths, the first numerical value T of the path to be the number of the at least one UCMP entry corresponding to the path;

when the second numerical value D is more than zero,
- sorting, by the network device, the N paths based on the respective weights of the N paths,
- determining, by the network device, for each of first D paths in the sorted N paths, the first numerical value T of the path plus 1 to be the number of the at least one UCMP entry of the path,
- determining, by the network device, for each of remaining paths in the sorted N paths, the first numerical value T of the path to be the number of the at least one UCMP entry of the path.

* * * * *